(12) United States Patent
Cagle

(10) Patent No.: US 7,475,509 B2
(45) Date of Patent: Jan. 13, 2009

(54) DECOY ANCHOR

(76) Inventor: Matthew F. Cagle, 1913 Kingfisher Dr., Morehead City, NC (US) 28557

( * ) Notice: Subject to any disclaimer, the term of this patent is extended or adjusted under 35 U.S.C. 154(b) by 99 days.

(21) Appl. No.: 11/552,600

(22) Filed: Oct. 25, 2006

(65) Prior Publication Data

US 2007/0266614 A1 Nov. 22, 2007

Related U.S. Application Data

(60) Provisional application No. 60/802,188, filed on May 19, 2006.

(51) Int. Cl.
*A01M 31/06* (2006.01)
(52) U.S. Cl. .................................................. 43/3
(58) Field of Classification Search ............... 43/3, 43/2, 43.1, 43.15, 44.87, 44.9, 44.91; 114/294, 114/297
See application file for complete search history.

(56) References Cited

U.S. PATENT DOCUMENTS

| | | | | |
|---|---|---|---|---|
| 231,906 A * | 9/1880 | Gladwish | ........................ | 43/3 |
| 243,954 A * | 7/1881 | North | ........................ | 43/3 |
| 283,195 A * | 8/1883 | Benjamin | ........................ | 43/3 |
| 364,573 A * | 6/1887 | Brinkop | ........................ | 43/3 |
| 368,427 A * | 8/1887 | Ryan | ........................ | 43/3 |
| 725,428 A * | 4/1903 | Evans | ........................ | 43/43.1 |
| 814,097 A * | 3/1906 | Tartsch | ........................ | 43/3 |
| 892,528 A * | 7/1908 | Kricke | ........................ | 43/3 |
| 1,264,515 A * | 4/1918 | Heckenkamp, Jr. | ........................ | 43/3 |
| 1,370,145 A * | 3/1921 | Moore | ........................ | 43/3 |
| 1,461,617 A * | 7/1923 | Hill | ........................ | 43/3 |
| 1,617,153 A * | 2/1927 | Gibbs | ........................ | 43/3 |
| 1,697,561 A * | 1/1929 | Freeman | ........................ | 43/3 |
| 1,879,991 A * | 9/1932 | Pratt | ........................ | 43/3 |
| 1,887,491 A * | 11/1932 | Johnson | ........................ | 119/714 |
| 1,902,393 A * | 3/1933 | Bosch | ........................ | 43/3 |
| 2,030,000 A * | 2/1936 | Harrington | ........................ | 43/43.13 |
| 2,086,008 A * | 7/1937 | Turner | ........................ | 43/42.39 |
| 2,111,958 A * | 3/1938 | Bardon | ........................ | 43/44.88 |
| 2,140,724 A * | 12/1938 | Stefan | ........................ | 43/44.9 |
| 2,214,668 A * | 9/1940 | Ingemar | ........................ | 43/42.36 |
| 2,252,795 A * | 8/1941 | Weems et al. | ........................ | 43/3 |
| 2,278,594 A * | 4/1942 | Smith | ........................ | 43/3 |
| 2,289,647 A * | 7/1942 | Grossenbach | ........................ | 43/3 |
| 2,413,418 A * | 12/1946 | Rulison | ........................ | 43/3 |
| 2,439,710 A * | 4/1948 | Banigan | ........................ | 43/3 |
| 2,457,295 A * | 12/1948 | Woodhead | ........................ | 43/3 |
| 2,489,271 A * | 11/1949 | Colgan | ........................ | 43/3 |
| 2,520,233 A * | 8/1950 | Buehl | ........................ | 43/3 |
| 2,555,815 A * | 6/1951 | Rawlins et al. | ........................ | 43/3 |
| 2,589,913 A * | 3/1952 | Wenner | ........................ | 43/3 |
| 2,595,966 A * | 5/1952 | Majors | ........................ | 43/3 |
| 2,616,200 A * | 11/1952 | Milam | ........................ | 43/3 |
| 2,630,093 A * | 3/1953 | Toal | ........................ | 43/3 |
| 2,651,135 A * | 9/1953 | Greenleaf | ........................ | 43/43.14 |
| 2,678,778 A * | 5/1954 | Gibson | ........................ | 43/3 |
| 2,734,301 A * | 2/1956 | Fuqua | ........................ | 43/44.9 |
| 2,747,315 A * | 5/1956 | Clemas | ........................ | 43/3 |

(Continued)

*Primary Examiner*—Darren W Ark
(74) *Attorney, Agent, or Firm*—Shannon V. McCue; Hahn Loeser & Parks LLP

(57) ABSTRACT

An anchor system including a tether attached to a floating decoy at a first end and a weight mounted on the tether and freely slidable to a position substantially adjacent to the floating decoy.

2 Claims, 2 Drawing Sheets

U.S. PATENT DOCUMENTS

| | | | | |
|---|---|---|---|---|
| 2,753,650 | A | * | 7/1956 | Rentz et al. ............... 43/43.1 |
| 2,766,549 | A | * | 10/1956 | Dickerson ............... 43/44.98 |
| 2,813,363 | A | * | 11/1957 | Leckner ............... 43/3 |
| 2,929,165 | A | * | 3/1960 | Byron ............... 43/3 |
| 2,942,370 | A | * | 6/1960 | Zaruba ............... 43/3 |
| 3,050,895 | A | * | 8/1962 | Bratland et al. ............... 43/3 |
| 3,055,134 | A | * | 9/1962 | Archer ............... 43/3 |
| 3,079,719 | A | * | 3/1963 | Muszynski ............... 43/3 |
| 3,120,715 | A | * | 2/1964 | Long ............... 43/44.9 |
| 3,149,433 | A | * | 9/1964 | Hagen ............... 43/3 |
| 3,341,966 | A | * | 9/1967 | Pippen ............... 43/44.9 |
| 3,436,856 | A | * | 4/1969 | Miller ............... 43/3 |
| 3,461,597 | A | * | 8/1969 | Hobson ............... 43/43.14 |
| 3,568,355 | A | * | 3/1971 | Hassell ............... 43/43.15 |
| 3,930,328 | A | * | 1/1976 | Knuth ............... 43/3 |
| 4,056,890 | A | * | 11/1977 | Dembski ............... 43/3 |
| 4,141,167 | A | * | 2/1979 | Muehl ............... 43/3 |
| 4,416,080 | A | * | 11/1983 | Morrissette ............... 43/42.2 |
| 4,528,771 | A | * | 7/1985 | Rea, Jr. ............... 43/44.9 |
| 4,530,181 | A | * | 7/1985 | Ender ............... 43/44.91 |
| 4,535,560 | A | * | 8/1985 | O'Neil ............... 43/3 |
| 4,612,722 | A | * | 9/1986 | Ferrell ............... 43/3 |
| 4,656,771 | A | * | 4/1987 | Holmes ............... 43/3 |
| 4,674,219 | A | * | 6/1987 | Chargo et al. ............... 43/3 |
| 4,727,676 | A | * | 3/1988 | Runyan ............... 43/43.1 |
| 4,757,630 | A | * | 7/1988 | Torberg ............... 43/3 |
| 4,826,099 | A | * | 5/1989 | Johnson ............... 43/3 |
| 4,827,653 | A | * | 5/1989 | Sewell ............... 43/3 |
| 4,888,909 | A | * | 12/1989 | Adams ............... 43/42.39 |
| 4,941,279 | A | * | 7/1990 | Swanson ............... 43/43.1 |
| 5,168,650 | A | * | 12/1992 | Martin ............... 43/3 |
| 5,189,828 | A | * | 3/1993 | Summers ............... 43/43.1 |
| 5,253,447 | A | * | 10/1993 | Rhinehart ............... 43/43.1 |
| 5,367,813 | A | * | 11/1994 | Cherry ............... 43/3 |
| 5,461,816 | A | * | 10/1995 | Gazalski ............... 43/3 |
| 5,822,907 | A | * | 10/1998 | Lukey ............... 43/3 |
| 5,887,381 | A | * | 3/1999 | Stephenson ............... 43/43.15 |
| 5,893,230 | A | * | 4/1999 | Koltoniak ............... 43/3 |
| 5,899,014 | A | * | 5/1999 | Bornhoft et al. ............... 43/3 |
| 5,941,008 | A | * | 8/1999 | Schmidt et al. ............... 43/2 |
| 5,960,579 | A | * | 10/1999 | Hampton ............... 43/44.9 |
| 5,992,078 | A | * | 11/1999 | Willis ............... 43/2 |
| 6,047,493 | A | * | 4/2000 | Strampe ............... 43/44.87 |
| 6,357,161 | B1 | * | 3/2002 | Best ............... 43/3 |
| 6,412,210 | B1 | * | 7/2002 | Horrell ............... 43/3 |
| 6,487,811 | B2 | * | 12/2002 | Barrett ............... 43/3 |
| 6,543,176 | B1 | * | 4/2003 | McGhghy ............... 43/3 |
| 6,647,657 | B2 | * | 11/2003 | Igo ............... 43/3 |
| 6,857,216 | B1 | * | 2/2005 | Merin ............... 43/3 |
| 7,117,628 | B1 | * | 10/2006 | Bailey ............... 43/3 |
| 7,117,629 | B2 | * | 10/2006 | Brzozowski ............... 43/43.15 |
| 7,257,921 | B1 | * | 8/2007 | Hellmann ............... 43/3 |
| 7,337,575 | B2 | * | 3/2008 | Hulley et al. ............... 43/3 |
| 7,347,024 | B1 | * | 3/2008 | Vest ............... 43/3 |
| 7,415,792 | B1 | * | 8/2008 | Noble ............... 43/43.15 |
| 2002/0157299 | A1 | * | 10/2002 | Barrett ............... 43/3 |
| 2004/0163300 | A1 | * | 8/2004 | Pinkston ............... 43/3 |
| 2006/0162228 | A1 | * | 7/2006 | Sieman ............... 43/3 |
| 2006/0242883 | A1 | * | 11/2006 | Tilby ............... 43/3 |
| 2008/0040966 | A1 | * | 2/2008 | Stone et al. ............... 43/43.15 |

* cited by examiner

DECOY ANCHOR

CROSS-REFERENCE TO RELATED APPLICATIONS

This application claims priority from provisional application U.S. Ser. No. 60/802,188, filed on May 19, 2006.

TECHNICAL FIELD

The present invention generally relates to an anchor for a floating decoy. More particularly, the present invention relates to an anchor for a floating decoy having a tether that attaches to the decoy and a weight that slides on the tether.

BACKGROUND OF THE INVENTION

In hunting, decoys are often used to attract game. Floating decoys are typically dispersed on a body of water and held in place by an anchor. Existing anchors include a rope or wire that attaches to the decoy and a weight that acts as ballast fixedly attached to the end of the rope opposite the decoy. While this setup works well for anchoring the decoy in a body of water, the disadvantages of the fixed weight and wire system become apparent when attempting to cast decoys or when storing them.

With the weight fixed at one end of the rope or wire, it is difficult to cast the decoy because the weight is not concentrated at the decoy end of the line. Since the weight and decoy typically have different mass, the anchor and decoy are unbalanced, making it difficult to cast the decoy.

Also, when storing multiple decoys, the fixed weight and wire, if left dangling, are a common source of entanglement. It will be appreciated that, in the pre-dawn hours before hunting, the chore of untangling anchors is highly undesirable. To that end, existing decoys have addressed this problem by providing spools on the decoy on which the wire is wrapped or by using a weight that can be attached to the decoy after the wire has been wound on the body of the decoy. One decoy employs a lead band as a weight that is sufficiently malleable that it may be crimped around the neck of a duck decoy to hold it in place after the wire has been wrapped around the decoy's body. While these systems help prevent entanglement, they require considerable time to wrap and unwrap the wire.

SUMMARY OF THE INVENTION

It is an object of the present invention to provide an improved anchor used in connection with a floating decoy.

In light of this object, the present invention generally provides an anchor for a floating decoy, the anchor including a tether having a first end attachable to the decoy and a second end, a stop formed at the second end, and a weight mounted on the tether and slidable between the first end and the stop.

The present invention further provides an anchor system including a tether attached to a floating decoy at a first end, the tether having a second end located distally from the first end, and a weight mounted on the tether and slidable to a position substantially adjacent to the floating decoy.

The present invention further provides an anchor for a floating decoy, the anchor system including a tether having a first end and a second end, the first end being attachable to the decoy, a weight defining an axially extending bore through which the tether extends, the weight being freely slideable on the tether, wherein the weight is adapted to slide to the first end of the tether when casting the decoy from the second end of the tether.

DETAILED DESCRIPTION OF THE INVENTION

Figure 1:
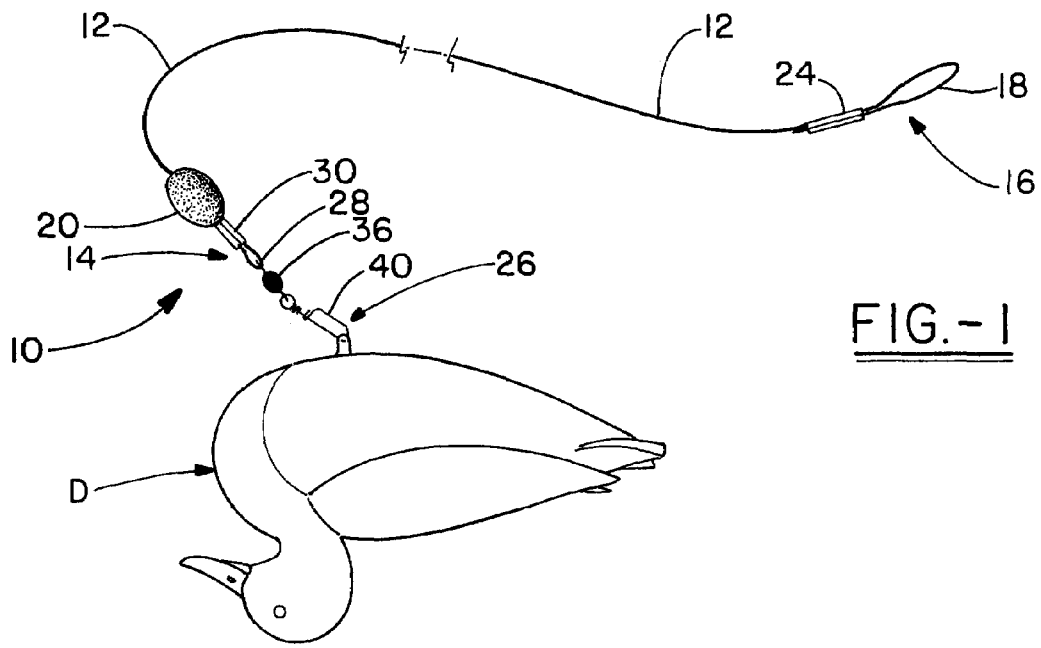
FIG. 1 is a partially-schematic, side-elevational view depicting an anchor according to the concepts of the present invention that includes a tether having a sliding weight mounted thereon attached to a floatable decoy, where the anchor and decoy are depicted in a position for casting and where the weight has moved on the tether to a position substantially adjacent to the decoy so that the decoy may be swung and released to cast it in a body of water.

A decoy anchor according to the concepts of the present invention is generally indicated by the number 10 in the accompanying drawings. Decoy anchor 10 includes a tether 12 having a first end 14 and a second end 16 located distally from first end 14. The first end 14 attaches to a floating decoy D. The second end 16 may include a loop 18 that is graspable by the user for the purpose of transporting decoy D as it hangs from tether 12. A weight 20 is attached to tether 12 so that it slides along the length of tether 12. To that end, weight 20 may be provided with a bore 22 through which tether 12 passes. Bore 22 may be formed in the weight 20, as shown, or be defined by a ring or other member attached to weight 20 for purposes of connecting to tether 12. Bore 22 may extend axially, forming a straight bore, to facilitate free sliding of weight 20 on tether 12.

Figure 2:
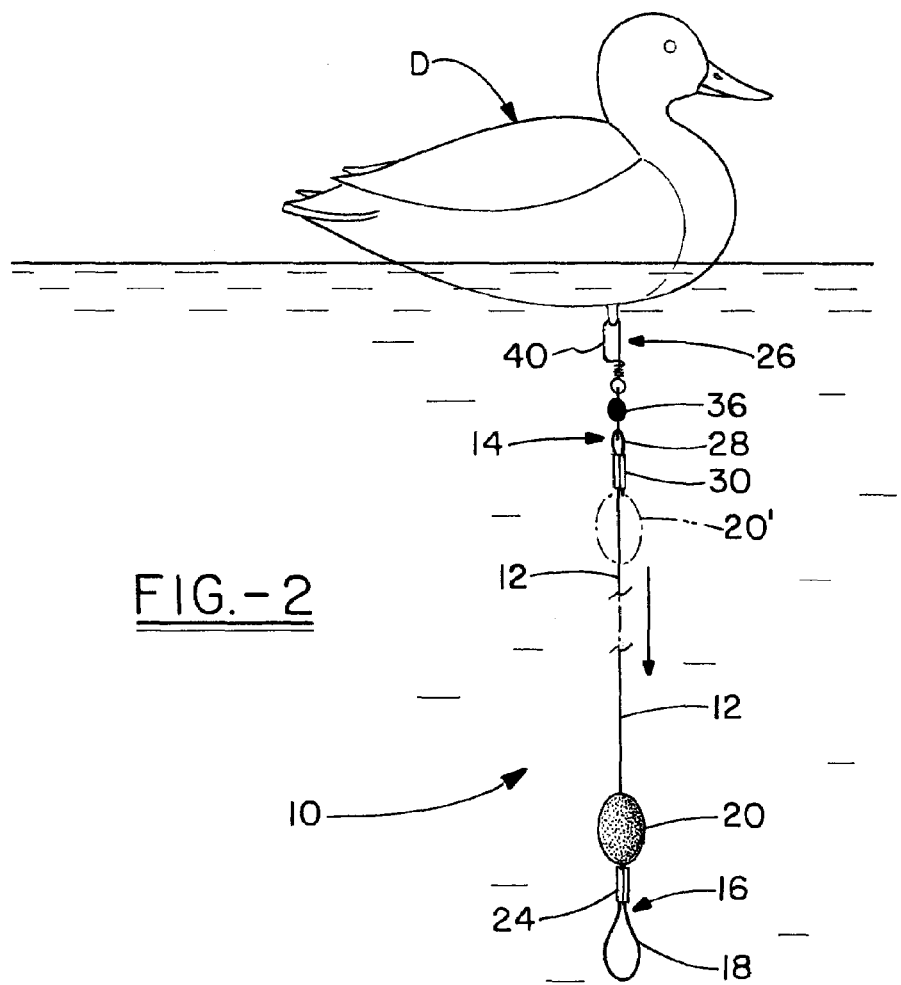
FIG. 2 is a partially-schematic, side-elevational view similar to FIG. 1 depicting the decoy on a body of water, where the weight has slid downward on the tether to an anchor position, as depicted by the arrow.

To aid the user in dispersing decoy D within a body of water, weight 20 slides to a casting position (FIG. 1) where it rests against the decoy D or substantially adjacent thereto. In this position, the user may swing decoy D while holding second end 16 of tether 12 before releasing the second end 16 and casting decoy D into the body of water. As shown in FIG. 2, when decoy D lands in the body of water, weight 20 slides downward from casting position 20' on tether 12 toward second end 16 to anchor decoy D in the body of water. It will be appreciated that tether 12 may include a stop 24 that holds weight 20 in a selected position on tether 12 and generally prevents weight 20 from sliding off of tether 12. Stop 24 is generally spaced from first end 14 and, as shown, may be located at or near second end 16 to maximize the anchoring effect of weight 20. It will be appreciated that stop 24 may include anything that suitably fixes the position of weight 20 on tether 12, including, for example, a knot, a bead of material, or other impediment affixed to or formed in the tether 12 having a diameter larger than that of bore 22. To that end, as shown in FIG. 2, loop 18 may act as a stop. The depicted example, however, is not to be considered limiting.

Figure 4:
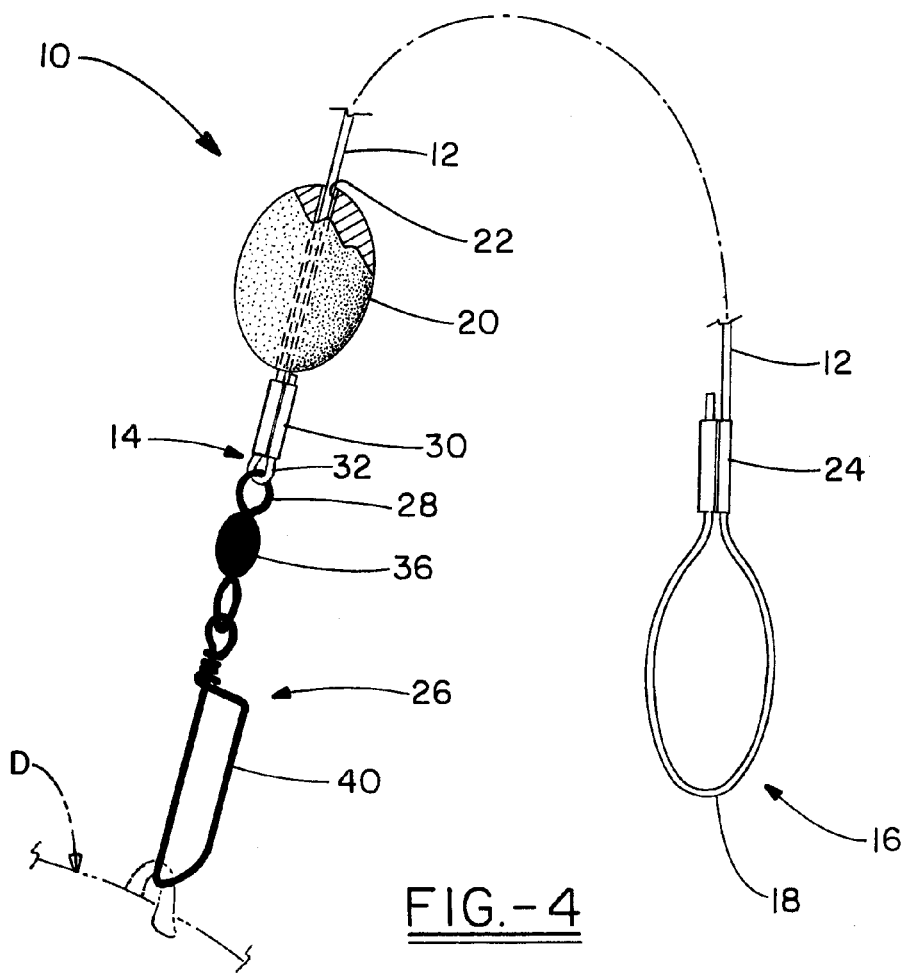
FIG. 4 is an enlarged, partially-schematic, partially-sectioned, side-elevational view depicting attachment of the anchor according to the concepts of the present invention.

The tether 12 may be attached to decoy D in any known manner, including tying the tether 12 directly to decoy D or by using a fastener 26. Fastener 26 may be any device that facilitates attachment of tether 12 to decoy D, including mechanical fasteners such as nails, staples, hooks, and clips, among others. In the example shown in FIG. 4, a releasable fastener 26, which includes a spring-like clip, is used to allow anchor 10 to be easily attached to or detached from decoy D. Use of this type of fastener facilitates retrofitting anchor 10 to existing decoys D.

In the example shown, fastener 26 may be attached to the first end 14 of tether 12 by threading the first end 14 of the tether 12 through an eye 28 on fastener 26 and then securing the first end 14 to the tether 12. As shown, a clasp 30 may be used for this purpose forming a loop 32 at eye 28. Alternatively, first end 14 may simply be tied to tether 12 to achieve the same effect. Other forms of attachment may be used as well.

For simplicity, the term "clasp" will be used to collectively refer to any fastener, knot, or other mechanism used to form a loop in tether 12. It will further be understood that the method of attaching fastener 26 to tether 12 is not limiting, as other forms of attachment may be used.

Fastener 26 optionally includes a joint 36 housing a rotatable member, which in the example shown is eye 28, such that eye 28 rotates independently of a clip 40 that releasably attaches to decoy D. In this way, decoy D is free to rotate independently of tether 12. Such independent rotation is believed to enhance the appearance of decoy D in the body of water and may facilitate dispersion of decoy D, as by throwing. It also may improve the storability of decoy D by allowing decoy D to rotate without twisting tether 12 when decoy D is hung by loop 18 formed in second end 16 of tether 12. While in the example shown the rotatable member is attached to tether 12, it will be appreciated that the rotatable member could be attached to decoy D to achieve the same effect.

In terms of storage, allowing weight 20 to slide downward substantially adjacent to decoy D facilitates transport and storage of decoy D by preventing weight 20 from becoming entangled or otherwise interfering with the gathering of multiple decoys by loop 18 formed at second end 16. For example, the user may grasp several decoys by their respective loops 18 formed at second end 16 of tether 12, causing weight 20 to slide downward toward first end 14, where decoy D attaches to tether 12. With weight 20 substantially adjacent to decoy D, second end 16 of each tether 12 is free to be gathered by the user and may be conveniently held by loop 18.

Existing decoys maintain the weight at the far end of tether 12 relative to the decoy. When storing the decoy, the dangling weight and tethers may become entangled, causing significant delay when retrieving the decoys. To avoid this problem, users will wrap the tether around the decoy and attach or tie the weight to the decoy. As a result, when preparing to use several decoys, the user must unwind each tether. While this technique avoids entanglement to an extent, it still requires a significant amount of time to unwind the tethers and prepare the decoys for use. It will be appreciated that since the decoys must be dispersed during pre-dawn hours, time is of the essence.

Figure 3:
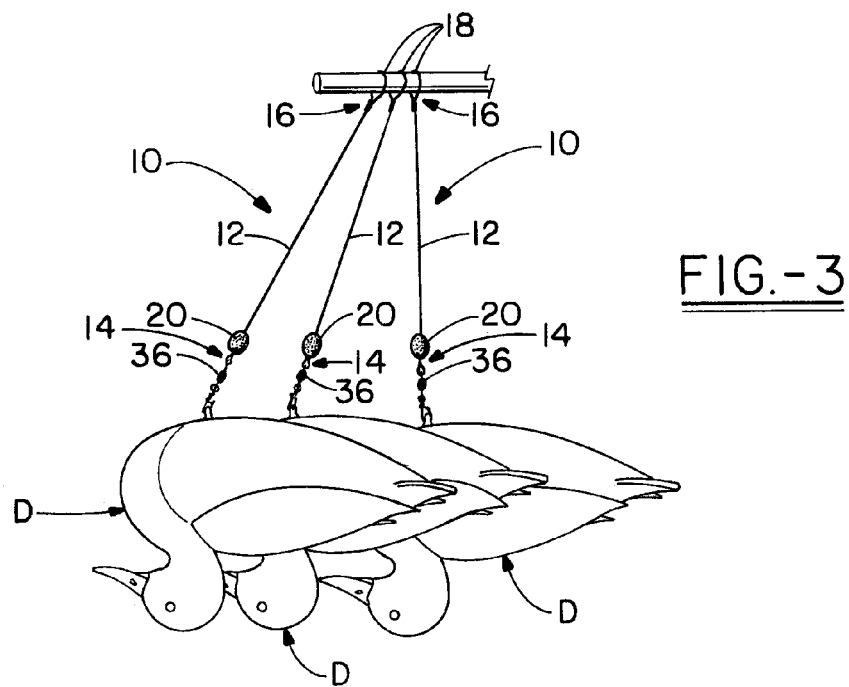
FIG. 3 is a partially-schematic, side-elevational view depicting multiple anchors according to the concepts of the present invention, each attached to a decoy and collectively hung on a peg by their respective loops formed in an end of the tether opposite the point at which the tether attaches to the decoy.

In contrast, when using the present invention, the user may simply grasp several decoys by their respective loops 18 formed in second end 16 of tether 12, which may conveniently be hung on a single hook or peg (FIG. 3), and take them to the body of water to which they are to be dispersed. Since, when the anchor 10 is hung by loop 18, the weight 20 slides down against decoy D, the weight 20 does not need to be attached or tied to decoy D. Also, the contact between decoys D separates the weights 20 and tethers 12 from each other, significantly reducing or eliminating entanglement.

To disperse decoy D according to the concepts of the present invention, the user would grasp second end 16 of tether 12, allowing weight 20 to slide substantially adjacent to decoy D (FIG. 1) so that substantially all of the combined weight of weight 20 and decoy D is located distally from second end 16, and then cast decoy D by second end 16 in contrast, existing decoys whose weight is fixed to the second end of the anchor are much more cumbersome in that the weight is not concentrated at a single end of the tether, making it difficult to cast the decoy.

Tether 12 may be any elongate, flexible member, including, for example, a string, rope, cable, wire, or strap, among others. In the example shown, a nylon cable was used for purposes of durability and to provide a surface on which weight 20 would freely slide. This example is not limiting, as other materials and types of tethers may be used to achieve suitable results.

Also, tether 12 may be of any length. In the example shown, a length of greater than twelve inches was used, and, in particular, the depicted example had a length of approximately twenty-four inches. This particular length is not limiting, as the length may vary to a great extent, depending upon the desired radius of decoy dispersion and the type of body of water in which the decoy is to be used.

Weight 20 may be any object having sufficient mass to suitably anchor a decoy, as is known in the art. Similarly, weight 20 may be constructed of any material. In the example shown, a substantially cylindrical lead weight having rounded ends was used to provide a compact, aerodynamic weight 20. It is believed that the use of a compact, aerodynamic weight 20 will facilitate casting of the decoys. This example is not limiting, as other weights, as described above, may be used to achieve suitable results.

While it is preferable to have weight 20 slidable to a point where it is substantially adjacent to decoy D, suitable results have been found where weight 20 slides more than halfway down tether 12 so that it is closer to first end 14 of tether 12 than it is to second end 16 of tether 12. To that end, stop 24 may be located at least half way between the first end 14 and second end 16 measured relative to second end 16.

To prevent damage to decoy D, another stop may be provided on tether 12 to prevent weight 20 from slamming into decoy D as it descends on tether 12. In the example shown, clasp 30 used to form the loop 32 in first end 14 of tether 12 acts as a stop.

It will be appreciated that other modifications and substitutions may be made to the described embodiment without departing from the spirit of the present invention. Therefore, for an appreciation of the scope of the present invention, reference should be made to the following claims.

The invention claimed is:

1. An anchor system in combination with a floating decoy, the combination comprising:

the floating decoy simulating a waterfowl;

a tether attached to the floating decoy at a first end, the tether having a second end located distally from the first end, the tether having an intermediate portion between the first and second ends;

a weight mounted on the tether and slidable to a position substantially adjacent to the floating decoy, the weight defining a bore extending axially therethrough which slidably receives the tether;

a first stop mounted near the first end and adjacent to the floating decoy adapted to prevent the weight from damaging the decoy, the first stop having a diameter larger than a diameter of the bore;

a first loop formed in the tether at the first end, the first loop formed by the first end being directed toward the second end and then secured in generally parallel relation to the intermediate portion of the tether by the first stop;

a second loop formed in the tether at the second end, the second loop formed by the second end being directed toward the first end and then secured in generally parallel relation to the intermediate portion of the tether by a second stop, the second stop is located along the tether between the second loop and the weight, the second stop having a diameter larger than the diameter of the bore, the weight being slidable between the first and second stops; and a rotatable fastener mounted to the first end at the first loop, the tether is releasably attached to the floating decoy by the rotatable fastener, the rotatable fastener has a joint that allows free rotation of the tether relative to the floating decoy, the fastener includes a clip that releasably attaches the fastener to the floating decoy.

2. The anchor system of claim 1, wherein the tether has a length of at least 12 inches.

* * * * *